(12) United States Patent
Mola et al.

(10) Patent No.: US 10,849,264 B1
(45) Date of Patent: Dec. 1, 2020

(54) DETERMINING ACTIVITY SWATH FROM MACHINE-COLLECTED WORKED DATA

(71) Applicant: Farmobile LLC, Leawood, KS (US)

(72) Inventors: Daniel Mola, Paola, KS (US); Joshua Freudenhammer, Olathe, KS (US)

(73) Assignee: FARMOBILE LLC, Leawood, KS (US)

(*) Notice: Subject to any disclaimer, the term of this patent is extended or adjusted under 35 U.S.C. 154(b) by 0 days.

(21) Appl. No.: 16/418,632

(22) Filed: May 21, 2019

(51) Int. Cl.
| | |
|---|---|
| *A01B 79/00* | (2006.01) |
| *G06F 17/14* | (2006.01) |
| *G01B 21/02* | (2006.01) |
| *G01B 21/28* | (2006.01) |
| *G07C 5/08* | (2006.01) |

(52) U.S. Cl.
CPC ........... *A01B 79/005* (2013.01); *G01B 21/02* (2013.01); *G01B 21/28* (2013.01); *G06F 17/141* (2013.01); *G07C 5/085* (2013.01)

(58) Field of Classification Search
CPC ...... A01B 79/005; G07C 5/085; G01B 21/28; G01B 21/02; G06F 17/141
See application file for complete search history.

(56) References Cited

U.S. PATENT DOCUMENTS

| | | | |
|---|---|---|---|
| 7,660,815 B1 | 2/2010 | Scofield et al. | |
| 2009/0096661 A1* | 4/2009 | Sakamoto | G01S 7/021 342/92 |
| 2018/0129987 A1* | 5/2018 | Tatge | G06F 13/4027 |

FOREIGN PATENT DOCUMENTS

| | | |
|---|---|---|
| AU | 2013/200475 B2 | 8/2013 |
| WO | 2019/089853 A1 | 5/2019 |

OTHER PUBLICATIONS

International Search Report and Written Opinion received for PCT Patent Application No. PCT/US2020/033213, dated Aug. 3, 2020, 6 pages.

* cited by examiner

*Primary Examiner* — Alexander Satanovsky
*Assistant Examiner* — Mark I Crohn
(74) *Attorney, Agent, or Firm* — Shook, Hardy & Bacon L.L.P.

(57) ABSTRACT

Embodiments of the present disclosure provide for tracking of collected machine or agronomic worked data to provide detailed analytical output. In various embodiments, a plurality of data points associated with a course of traversal within a collection area is obtained. Each point of the plurality of data points corresponds to a location within the collection area and includes a corresponding set of spatial coordinates. A distribution is generated based on the spatial coordinates. The distribution includes an identified set of occurrences associated with one of the spatial coordinates of the set of spatial coordinates. The distribution is input into a Fourier transform to determine a set of frequencies associated with identified peaks. An effective coverage width, which is the distance corresponding to a peak in the Fourier transform, is determined based on the set of frequencies associated with the identified peaks.

18 Claims, 6 Drawing Sheets

DETERMINING ACTIVITY SWATH FROM MACHINE-COLLECTED WORKED DATA

BACKGROUND

Agriculture is a rapidly evolving industry where technological advances are becoming increasingly important. Machine-collected worked data (also referred to herein as collected worked data) can be integral in an abundance of useful applications. The data can be used to optimize processes and mitigate inefficiencies, among other things. Machine-collected worked data can provide valuable analytical insight into farming methodologies, harvest yields, employee efficiencies, and more. Specifically, coverage width data can provide information pertaining to swath width which, in turn, is utilized to generate analytical output including, for instance, a number of acres worked in a given time, an amount of product used to cover an area, time spent in an area, harvest yield, field coverage, field boundary generation, and more. Swath width is necessary to generate such analytics. Conventional agricultural analytic tools generally fail to calculate swath widths based on automatically collected worked data in the generation of analytical outputs.

SUMMARY

Embodiments of the present disclosure generally relate to tracking of machine-collected worked data to generate analytics used to determine agronomic metrics (e.g., effective coverage width, total coverage area, efficiency values, etc.). More specifically, embodiments describe systems, methods, and computer-readable media for tracking, collecting/obtaining, and analyzing machine-collected worked data to generate a unit-agnostic data set consumable by a Fourier transform to generate distributions of data used to determine an effective coverage width.

In various embodiments, a user (e.g., a farmer) can employ a data collection device coupled to farming machinery (e.g., a tractor) operable by the user. The data collection device can be associated with the farming machinery, an implement associated with the farming machinery, a user account of the user, and the like, and can collect raw data generated by the farming machinery. In some aspects, the data collection device can geo-tag the collected raw data based on detected location information, including but not limited to GPS data, cell tower data, Wi-Fi signal data, and the like. In some embodiments, the user can employ the data collection device and/or an associated client device to upload raw data that was or is being generated by the farming machinery and collected by the data collection device. In some other embodiments, the collected raw data can be automatically uploaded (e.g., continuously, periodically) from the data collection device to a server device during (e.g., in real time) or after operation of the farming machinery. The machine-collected worked data can be manipulated through various means (described hereinafter) to generate a unit-agnostic data set consumable by a Fourier transform to generate a Fourier analysis of distributions of the collected worked data. The Fourier analysis can be utilized to identify, for example, an effective coverage width. An effective coverage width, as used herein, refers generally to a distance corresponding to one or more peaks within the Fourier analysis. The effective coverage width also refers to the inverse of the frequency corresponding with/to a peak in the Fourier analysis. The effective coverage width derived from the Fourier analysis can correspond to an actual swath width of an implement associated with the collected worked data. Thus, in accordance with the various embodiments described herein, the described techniques can facilitate a means for determining agronomic metrics (e.g. an effective coverage width, a swath width, etc.) utilizing collected worked data, among other things.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

Figure 1:
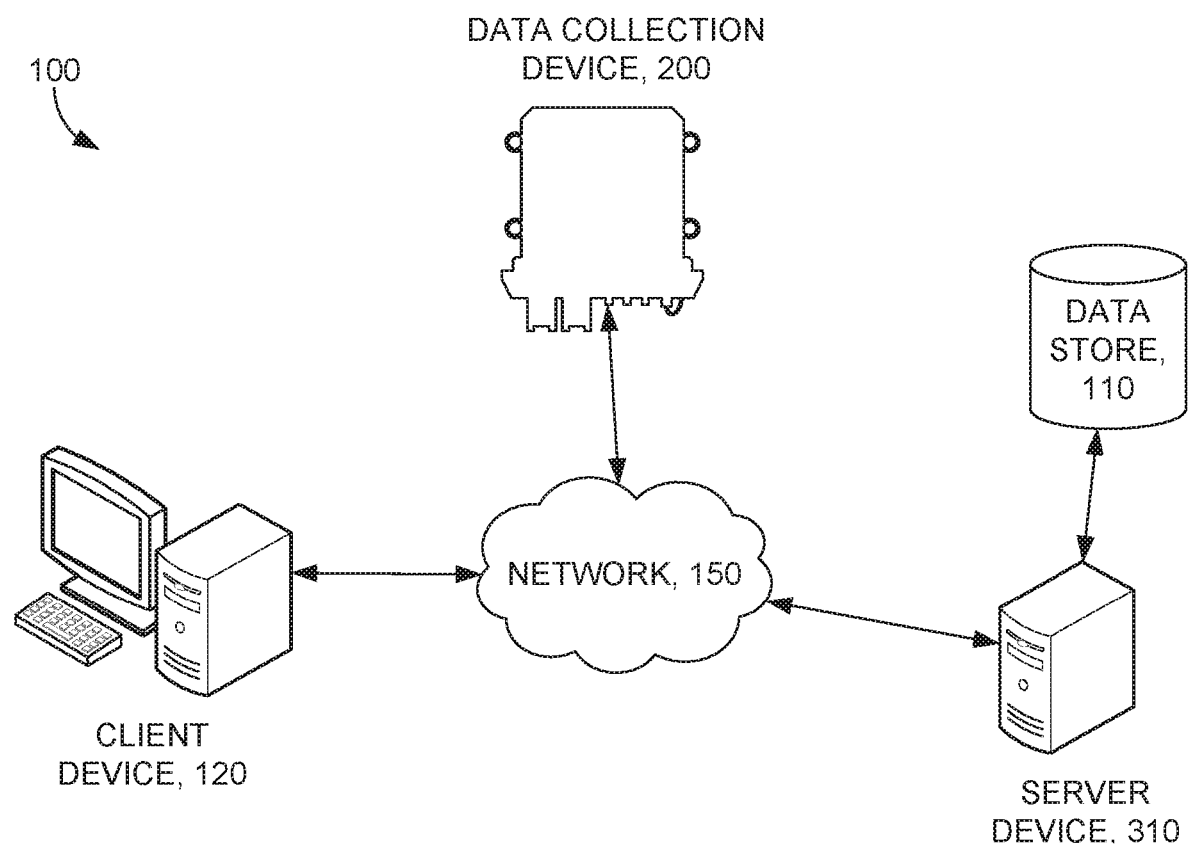
FIG. 1 is an exemplary system diagram in accordance with some embodiments of the present disclosure.

The use of collected worked data, such as data collected by, for example, Internet of Things ("IoT") devices, is expanding across industries. The agricultural industry, for instance, has evolved in this regard, whereby farming machinery can now include integrated technologies that collect various types of data from the laborious efforts of farmers. This collected worked data is valuable for a variety of analytical uses. The data collected has presented limits, however, with respect to some data that is necessary for analytics generation. For instance, swath width is a metric that is utilized in a number of agronomic calculations such as, but not limited to, a total area covered, an efficiency in coverage, and the like. Although crucial to the generation of such agronomic analytical data, a user-entered swath width is most often utilized and presents a variety of issues since it is not an accurate representation of an effective coverage width (also hereinafter "activity swath"). For instance, a swath width of an implement may be 30 feet. However, an employee may experience significantly more overlap than is necessary, reducing the coverage width to less than the actual swath width. Further, user-supplied entry of the swath width value is prone to include additional errors. Thus, automatic collection of data that can be utilized to automatically generate an effective coverage width is integral to maximizing efficiencies. This can involve both a sophisticated data collection device and an intelligent server device to analyze the collected worked data.

Devices that enable collection of agricultural data are rapidly emerging. One such company, Farmobile, LLC, of Leawood, Kans., has developed a solution that enables farmers to collect data. A data collection device that can be coupled to farming machinery to collect raw farming data from the farming machinery is provided. More detail relating to the data collection device and related systems and methods can be found in pending U.S. patent application Ser. No. 15/794,463, which is assigned or under obligation of assignment to the same entity as this application, the entire contents being herein incorporated by reference. The data collection device can be used to collect data that can be manipulated into additional formats that can be used to calculate other data or digested by algorithms to create new data. The collected worked data utilized to generate a coverage width can include a plurality of data points corresponding to a location along a course of traversal and will be further discussed herein.

Once collected, a need still exists to further analyze and transform the collected worked data into a usable format to obtain a coverage width. A naïve geometric approach could be used to evaluate each of the plurality of data points to identify individual rows next to one another to determine an effective coverage width. Such a geometric approach would require a point by point comparison. Nearly all algorithms that require point by point comparisons require an extra assumption that may or may not be true (e.g., assume specific driving behavior (straight line), assume a layout of a collection area, etc.). Furthermore, these approaches are not resistant to noise and, thus, erroneous lines (e.g., such as driving across an area to a road) cause problems geometrically. Therefore, existing approaches either assume a behavior that may be false; make no assumption and require a point by point comparison; and/or include additional noise due to the inability to effectively exclude erroneous data.

Provided the foregoing, embodiments described herein can facilitate the tracking of machine-collected worked data or agronomic data (i.e., farming data) to provide spatial points (e.g., GPS coordinates) to use as an input to a Fourier transform (e.g., Fast Fourier Transformation (FFT)) to generate a Fourier analysis (i.e., an output distribution) corresponding to frequency of peaks (e.g., rows) in the input. The output distribution can be used to identify an effective coverage width, which can be used to generate sophisticated agronomic metrics. In this way, users (e.g., farmers) responsible for collecting the farming data can rely on the generation of expansive agronomic data automatically.

Turning now to FIG. 1, a schematic depiction is provided illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 depicted in FIG. 1 includes a user client device 120 that can communicate with a server device 310 over a network 150, such as the Internet. Each of the user client device 120 and server device 310 can include a computing device, as described in more detail with respect to FIG. 8.

The system 100 preferably includes a network 150 that enables communication between at least one data collection device such as data collection device 200, at least one server device such as server device 310, and at least one client device such as client device 120. In various embodiments, the network 150 can include one or more networks including, but not limited to, the Internet, WANs, LANs, PANs, telecommunication networks, wireless networks, wired networks, and the like.

A data collection device associated with a user account of a user (e.g., a farmer), a machine, or the like, such as data collection device 200, can be coupled to at least one raw data generating device, such as a piece of farming machinery by way of example. It is contemplated that the farming machinery can include a set of sensors, computing devices, and/or electronic components that can generate raw data from the farming machinery and/or modules coupled thereto. The raw data (e.g., raw farming data) can include electronic data generated by the set of sensors, computing devices, and/or electronic components coupled to any other set of sensors, computing devices, and/or electronic components, a central control unit (e.g., a computer located within a cab of the farming machinery), or any combination thereof. In some aspects, the generated data is considered raw data, as the data can be collected directly from the generated set of sensors, computing devices, and/or electronic components, before it is communicated to a computing device for manipulation and/or analysis, among other things.

In various embodiments, and as will be described in accordance with FIG. 2, the data collection device 200 can communicate the collected raw farming data to a server device 310. The server device 310 can include, among other things, at least one computing device, such as the computing device described in accordance with FIG. 8. As will be described in accordance with FIGS. 3-6, the server device 310 can be one device of a plurality of devices configured to collectively analyze collected worked data. In various embodiments, the server device 310 can receive the collected raw farming data from the data collection device 200, and store to a memory, such as data store 110, the received raw farming data in association with the user account associated with data collection device 200.

Figure 4:
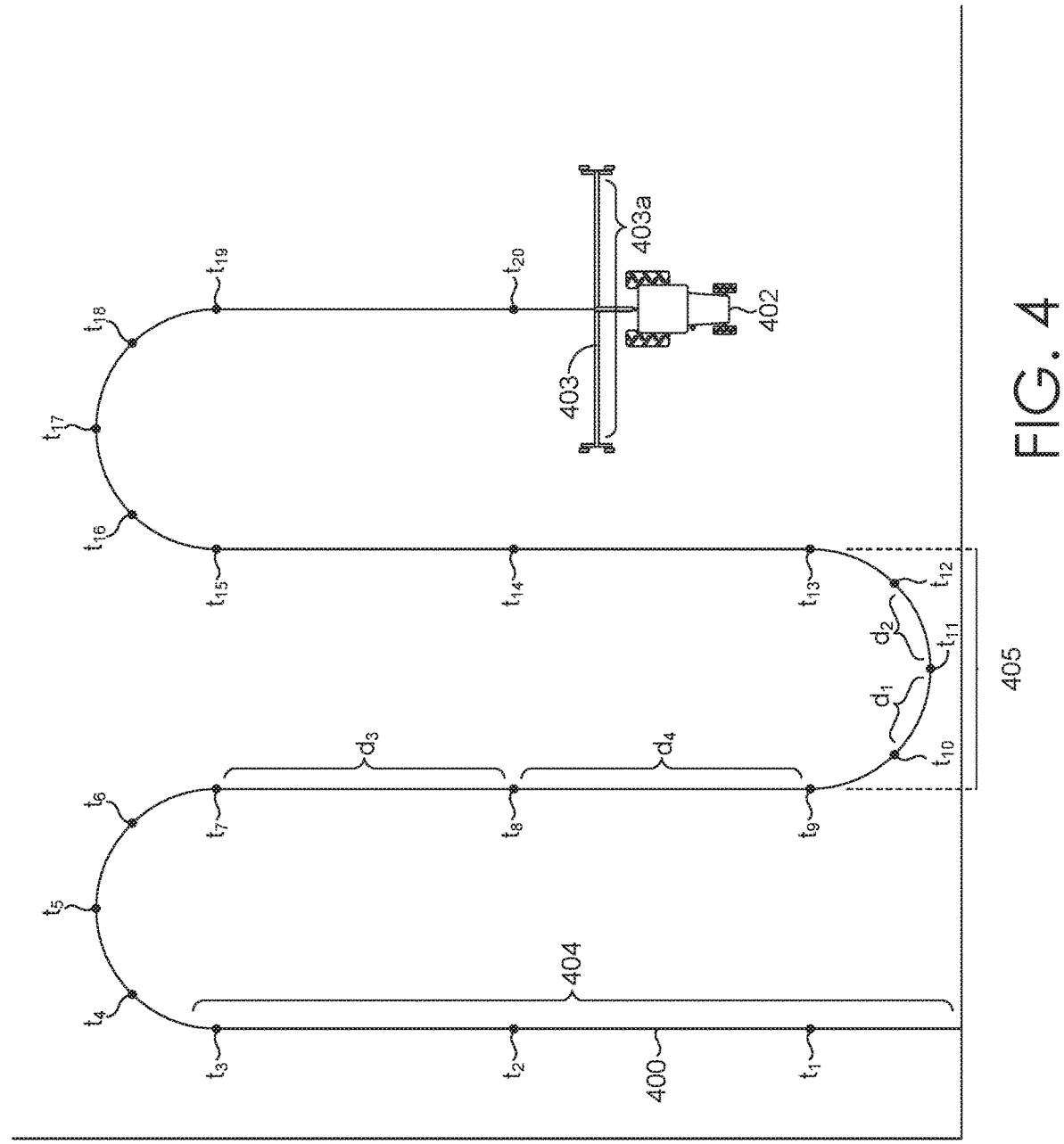
FIG. 4 is an illustrative course of traversal within a collection area in accordance with some embodiments of the present disclosure.

In some embodiments, the data collection device 200 collects a plurality of data points that are associated with a course of traversal within a collection area (e.g., a field). In some embodiments, the course of traversal comprises a set of substantially parallel lines. The course of traversal can be substantially serpentine but is not required. An exemplary course of traversal within a collection area is illustrated in FIG. 4. The course of traversal can be associated with a machine, an implement, and the like. The course of traversal can be any exemplary course traversed with the intention of full coverage of a collection area such as, for instance, a field. Data points collected from a course of traversal can be a result of an effort to optimize full coverage of a collection area.

As shown in FIG. 4, a course of traversal 400 is traversed by a machine 402 associated with an implement 403 having a swath width 403a. A plurality of data points, represented as $t_1$-$t_{20}$, can be collected along the course of traversal 400. As previously described, data points can be collected by a device (such as data collection device 200 of FIG. 1) and can be collected at customizable predetermined time intervals. In embodiments, the predetermined time interval between each collected data point is equal. As is shown in FIG. 4, the machine 402 travels at a slower rate around turns, such as turn 405, than on a straight portion, such as straight portion 404. Hence, a distance between the data points ($d_1$ and $d_2$) on the turns is smaller than a distance between each data point ($d_3$ and $d_4$) on a straight portion of the course of traversal 400.

The data points collected can correspond to a location within the collection area and include a set of spatial coordinates. The spatial coordinates can include GPS coordinates, Universal Transverse Mercator (UTM) coordinates, and the like.

The server device 310 can obtain the above-described data (e.g., the plurality of data points) associated with a course of traversal within a collection area from the data collection device 200 and store that data in memory, such as data store 110. The server device 310 can manipulate the plurality of data points to create a distribution, such as a histogram distribution, of the plurality of data points. This manipulated data can be based, at least in part, on a corresponding set of spatial coordinates obtained from the data collection device 200. A discrete Fourier transform of the distribution can be calculated to determine a set of frequencies associated with identified peaks. Based on a most probable frequency, the server device 310 can determine an effective coverage width associated with the course of traversal.

Figure 2:
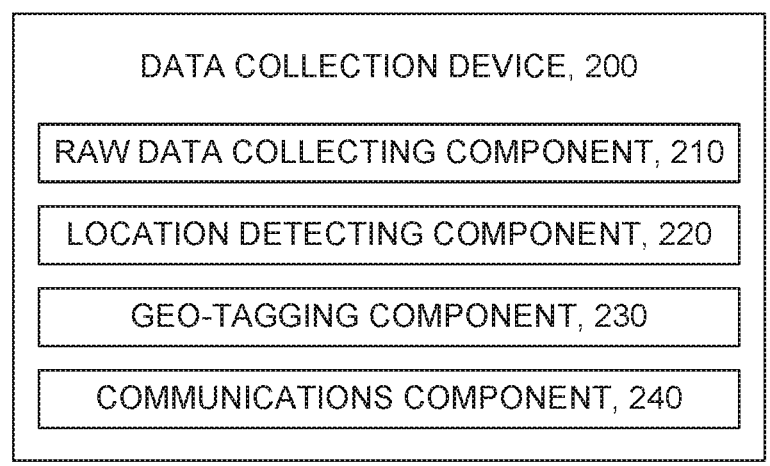
FIG. 2 is a block diagram depicting an exemplary data collection device in accordance with some embodiments of the present disclosure.

Referring now to FIG. 2, a block diagram is provided depicting an exemplary data collection device 200 in accordance with some embodiments of the present disclosure. The data collection device 200 can be associated with a unique identifier, such as a hardware ID, serial number, electronic identifier, among other things. In some embodiments, the unique identifier can be encoded into hardware and/or software of the data collection device 200. In some further embodiments, the unique identifier can be associated with a user account, such that a logical or symbolic mapping there between is maintained in a memory of a server, such as server device 310 of FIG. 1.

Figure 8:
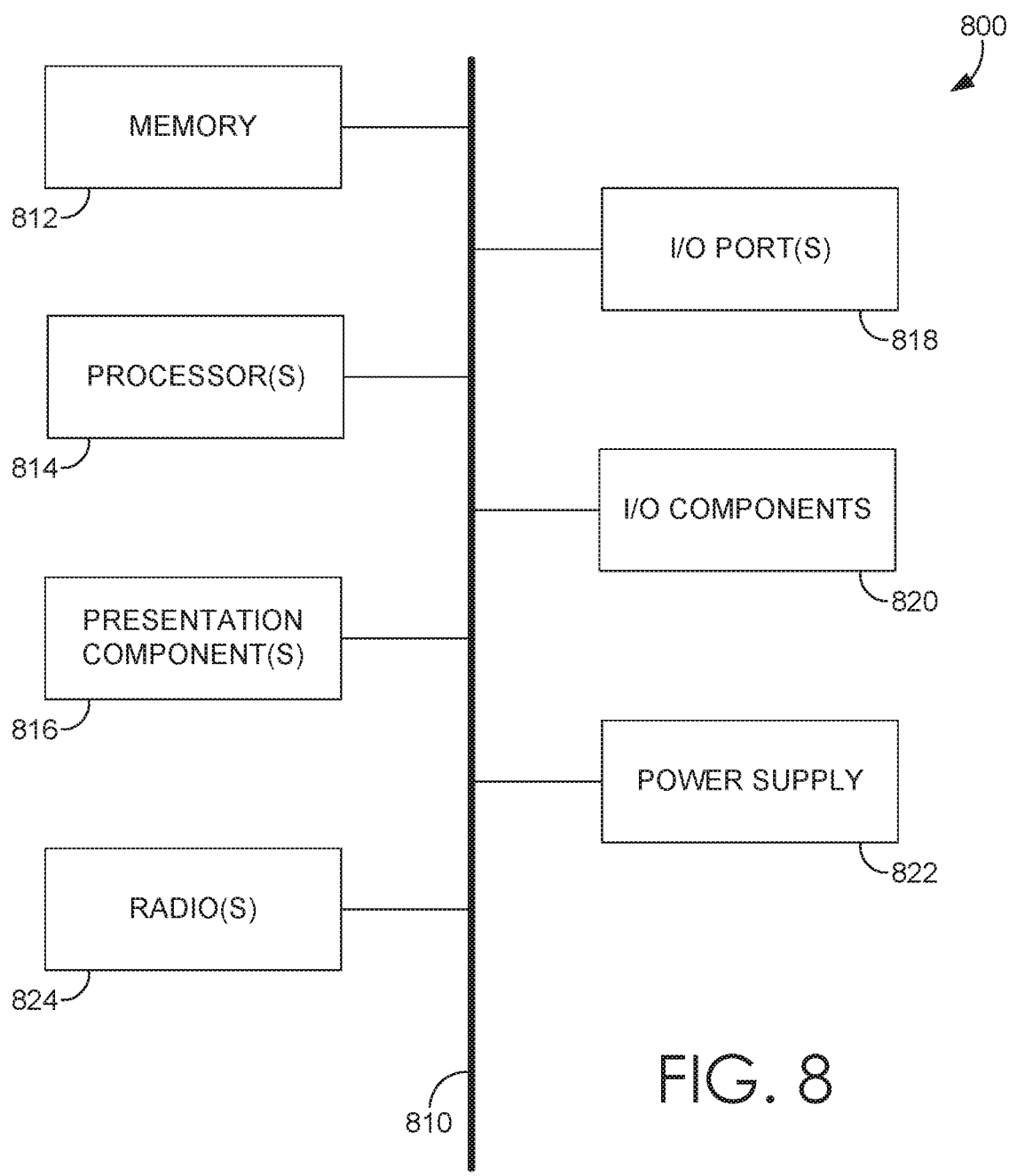
FIG. 8 is a block diagram of an exemplary computing environment suitable for use in implementing some embodiments of the present disclosure.

In accordance with various embodiments, data collection device 200 can include at least one computing device described in accordance with FIG. 8, and can be coupled to one or more data lines further coupled to sensors, computing devices, electric lines, modules, or other raw data sensing, raw data collecting, and/or raw data generating electronics (herein collectively referred to as "sensors") associated with a piece of farming machinery and/or components coupled thereto. In some embodiments, the data collection device 200 can include at least one input port for receiving and storing the raw data in a memory (e.g., a data storage device), and at least one output port for passing through the received raw data to a computing device associated with the piece of farming machinery. The data collection device 200 can also be coupled to a power source, such as a battery, or a power source associated with the piece of farming machinery. The data collection device 200 can further include, among other things, a raw data collecting component 210, a location detecting component 220, a geo-tagging component 230, and a communications component 240.

In some embodiments, the raw data collecting component 210 can receive raw data communicated from the sensors to an input port of the data collection device 200. The raw data collecting component 210 can store the received raw data into a cache or a memory. The data collection device 200 can further include a location detecting component 220 that can detect a physical location of the data collection device 200. In some embodiments, the location detecting component 220 can include a GPS module for determining GPS coordinates, a Wi-Fi antenna for detecting nearby Wi-Fi signals, a cellular radio for detecting nearby telecommunication towers, a Bluetooth radio for detecting nearby Bluetooth radios, or any other location detecting technology for determining a precise or approximate location of the data collection device 200.

In some embodiments, the data collection device 200 can employ the location detecting component 220 to determine a location of the data collection device 200 in accordance with receiving raw data via the raw data collecting component 210. In other words, at substantially the same time (e.g., under 1 second) of receiving a piece of raw data via raw data collecting component 210, the data collection device 200 can determine the location of data collection device 200 at substantially the same time the piece of raw data is received. In some embodiments, each piece of raw data and each piece of determined location information can be independently timestamped, such that the data collection device 200 can associate a piece of received raw data to a piece of determined location information. In this regard, the data collection device 200 can employ a geo-tagging component 230 to "tag" (e.g., map, embed into, modify) each piece of received raw data with a piece of determined location information. In other words, each piece of received raw data can be tagged with a location of the data collection device 200 determined at a time the piece of raw data was collected by the data collection device 200. In this regard, the received raw data being geo-tagged by geo-tagging component 230 and stored in a cache or memory of the data collection device 200 can be referenced herein as collected worked data.

Figure 3:
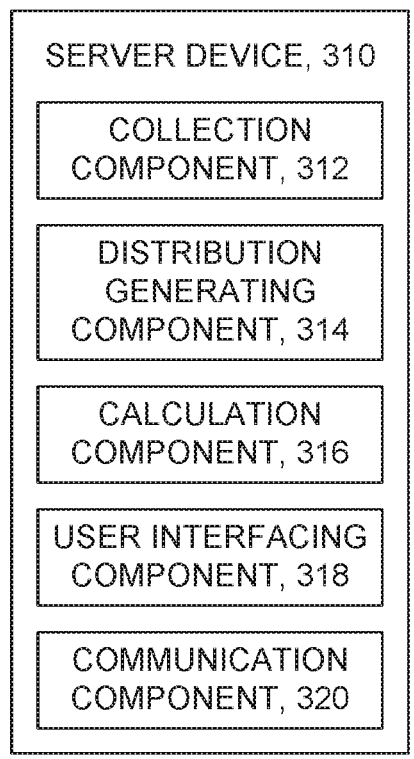
FIG. 3 is a block diagram depicting an exemplary server device in accordance with some embodiments of the present disclosure.

In some further embodiments, the data collection device 200 can include a communications component 240, which facilitates the wired and/or wireless communication of the collected raw farming data to a server, such as server device 310 of FIGS. 1 and 3. In some embodiments, the data collection device 200 can communicate the collected worked data to the server device in real time, such that the collected worked data is continuously streamed or periodically communicated to the server device. In some other embodiments, the data collection device 200 can communicate the collected worked data to the server device when a communications signal (e.g., Wi-Fi signal, Bluetooth signal, cellular signal) is available to the communications component 240. In this regard, the received raw data can continue to be geo-tagged and stored in a memory or cache of the data collection device 200, such that when the communications signal is available, the communications component 240 can establish a signal with the server device and communicate the collected worked data to the server device.

In some embodiments, the communications component 240 can communicate the unique identifier associated with the data collection device 200 prior to or in conjunction with any portion of collected worked data communicated to the server device. In some other embodiments, the geo-tagging component 230 can include metadata including the associated unique identifier when "tagging" the received raw data. In this way, the server device can determine that the collected worked data being received is associated with the data collection device 200, and can further determine that the collected worked data being received is associated with a user account associated with the data collection device 200.

With reference to FIG. 3, a block diagram is provided depicting an exemplary server device 310 in accordance with some embodiments of the present disclosure. The server device 310 can include at least one computing device described in accordance with FIG. 8, and can further include a collection component 312, a distribution generating component 314, a calculation component 316, a user interfacing component 318, and a communication component 320.

The collection component 312 can include various components that, among other things, facilitate obtaining the plurality of data points associated with a course of traversal within a collection area described herein. The plurality of data points can be obtained from, for instance, the data collection device 200. The plurality of data points can be obtained by retrieving the plurality of data points, receiving (either automatically or upon request) the plurality of data points, and the like, via a network such as network 150 of FIG. 1. As previously mentioned, the plurality of data points can correspond with a location within the collection area (e.g., GPS coordinates).

The collection component 312 can parse the collected worked data received from the data collection device 200 based on tags associated with the collected worked data. By virtue of the collected worked data being geo-tagged, the collection component 312 can select a portion of the collected worked data obtained from the data collection device, to generate a set of collected worked data that corresponds to a specific task performed with the farming machinery. In embodiments, the collection component 312 can identify location information and/or timestamps associated with the collected worked data received from the data collection device 200, such that both location and time are considered to identify relevant pieces of collected worked data. In some aspects, the related pieces of collected worked data can be identified automatically (e.g., based on timestamps and/or location being determined substantially continuous) or manually (e.g., based on provided timestamps and/or location received via a client device). In this way, one or more sets of collected worked data associated with a user account can be determined, each being related to a particular area or geographic locus, time period, and/or task performed by a user (e.g., farmer) associated with the user account and with the farming machinery coupled to the data collection device 200.

Figure 5:
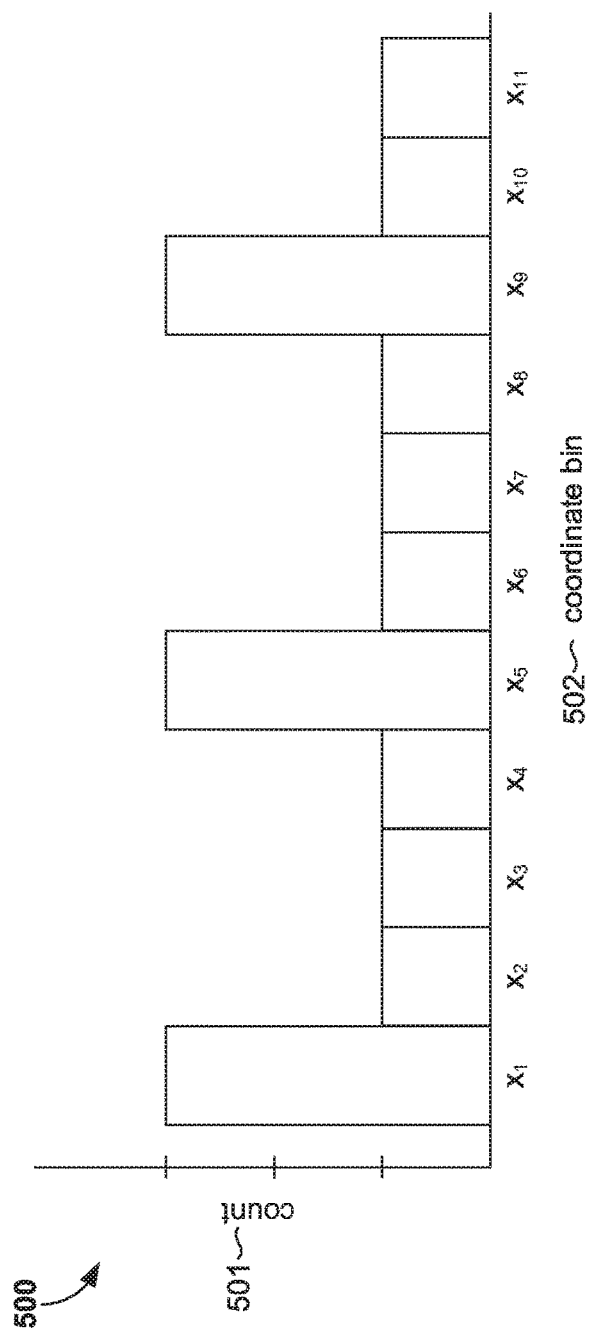
FIG. 5 is an exemplary distribution in accordance with some embodiments of the present disclosure.

The distribution generating component 314 can generate an output of the plurality of data points based, at least in part, on the corresponding sets of spatial coordinates (e.g., GPS coordinates). An exemplary output is illustrated in FIG. 5, which provides a histogram distribution 500 of counts/occurrences 501 versus coordinate bin 502 (i.e., distances from an origin point). FIG. 5 illustrates, for example, a number of counts or occurrences of data collection at coordinate bins $x_1$-$x_{11}$. That is, data points $t_1$, $t_2$, and $t_3$, were all collected within $x_1$ while only data point $t_4$ was collected within $x_2$, data point $t_5$ was collected within $x_3$, and so on. The distribution is created in a format that is consumable by a Fourier transform as it can be used as an input into the Fourier transform. In embodiments, a 1-dimensional (1-D) Fourier transform is used.

When creating the output, the distribution generating component 314 can rotate the data points such that a correct angle is identified. The distribution generating component 314 can use multiple rotations on one axis and manipulate the data to identify a most relevant occurrence. Rotations can be performed until it is determined that each occurrence is associated with a maximum value. Such rotation is not necessary when a correct angle is known. Additionally, rotation may not be necessary if performing the process described herein with a 2-dimensional (2-D) transform. In that instance, a 2-D distribution can be created and then input into a 2-D FFT to get an output distribution.

In the present example, the collected data points result in a 2-dimensional plot of points. A direction of travel is analyzed for each data point to identify a preponderance direction of travel (i.e., a direction of travel associated with greater than a predetermined threshold of data points). The data can be rotated to, for instance, a north/south orientation and then collapsed down to a 1-dimensional output to get a number of occurrences that happen at each coordinate bin. Each path in the 2-dimensional plot can be, for instance, vertical such that when it is collapsed to a 1-dimensional output the data points are organized into, for example, buckets of counts for a particular coordinate bin. Then a next bucket associated with a next range of distances from an origin point is evaluated and so on. Put another way, a 2-dimensional location plot can be compressed into a 1-dimensional histogram to demonstrate occurrences of data points in relation to each other.

The calculation component 316 can calculate a discrete Fourier transform of the output (generated by the distribution generating component 314, for example) to determine a set of frequencies associated with identified peaks within an output of the Fourier transform. Thus, the calculation component 316 can input a distribution (in the case of a 1-D transform) to create a Fourier analysis output. The Fourier transform processes information from all points to calculate a probability of distance between arbitrary points.

An exemplary Fourier analysis is provided in FIG. 6, discussed in further detail below. The calculation component 316 can use the distribution output (e.g., histogram distribution) to identify a frequency of rows such that a spacing between the rows is also identified. In embodiments, a probability of a row spacing is identified as a spike/peak in the Fourier analysis. Put another way, the calculation component 316 uses the input to the Fourier transform from the distribution generating component 314 to extract patterns therefrom to use said patterns to create an output distribution that represents a frequency of the input patterns.

This analysis is critical since, as previously explained, geometric methods only allow identification of how close specific rows are to one another. Fourier transform, however, is designed to find frequencies of patterns in a distribution. Furthermore, the Fourier transform is noise resistant as it looks at inherent frequencies of the row spikes and can discard data points that do not correspond to row spikes.

Once the Fourier analysis is output, the calculation component 316 can identify an effective coverage width. The effective coverage corresponds to a peak (or multiple peaks) in the Fourier analysis. While multiple peaks may be utilized, the present disclosure can be performed with a single, most prominent peak, which maps directly to a spatial frequency from which the distance is derived.

The effective coverage width can correspond to an actual swath width of an implement associated with a course of traversal. The effective coverage width can also vary from an actual swath width of an implement associated with the course of traversal (e.g., depending on overlap). The effective coverage width can be identified utilizing peak-finding algorithms to identify peaks within the output distribution. In embodiments, the effective coverage width is the inverse of the frequency mapped to the most prominent or reliable peak of the Fourier analysis. In other embodiments, the effective coverage width is the inverse of the difference between frequencies (e.g., spatial frequencies) mapped to multiple peaks of the Fourier analysis.

Figure 6:
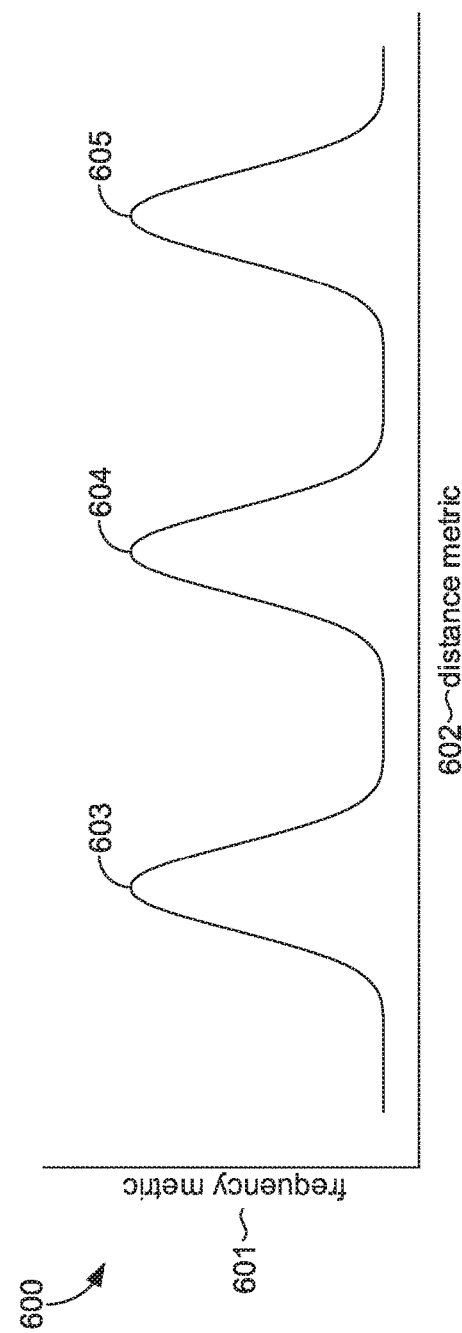
FIG. 6 is an exemplary Fourier analysis in accordance with some embodiments of the present disclosure.

The exemplary Fourier analysis 600 illustrated in FIG. 6 includes a frequency metric 601 versus a distance metric 602. The Fourier analysis 600 further includes a plurality of peaks 603, 604, and 605. Each of the plurality of peaks can represent a probability of a row spacing in the course of traversal within the collection area. Frequency peaks 603-605 represent probable effective coverage widths. The result from the Fourier transform can be utilized to create more accurate coverage map data through generation of the effective swath width, which, in turn, allows users to more accurately calculate efficiency.

Returning to FIG. 3, the calculation component 316 can use the effective coverage width to further generate agronomic data. For instance, the calculation component 316 can calculate a total coverage area, efficiency values, amount of product used per acre, total seeds planted per acre, total product sprayed, harvest yield, amount of overlap between rows (e.g., overlap of 2 feet in each pass is associated with a specific efficiency value while an overlap of 5 feet in each pass is associated with a different specific efficiency value), employee efficiencies, heat maps, etc.

The calculation component 316 can also utilize agronomic data captured by, for instance, the data collection device 200, to apply a weight value to the input data points. For example, assume that GPS coordinates are being collected while a farmer is spreading product on a field. If the farmer turns off the spreading of the product and veers off to leave the field, resulting in the farmer's machine intersecting with existing rows, the calculation component 316 can utilize the agronomic data (i.e., farmer turning off the spreading of the product) to identify that the data should be emphasized less. Put simply, no product is being applied so the activity of the machine is less important. Thus, that information may be weighted less than data is that is deemed important by the use of agronomic data or any other means available to the calculation component 316.

In further embodiments, a smoothing filter can be applied to provide a smoothing function to the output distribution to facilitate reduction in noise. Any available smoothing filters that would facilitate reduction in noise in a distribution can be utilized. An exemplary smoothing filter is a Savitzky-Golay filter.

Continuing with FIG. 3, the user interfacing component 318 can provide an interface such as a web portal or web page that enables a user to access the data collected and the generated analytical outputs described herein with an associated client device, such as client device 120, from a server device, such as server device 310. In various embodiments, the server device 310 can generate a graphical user interface (GUI) that can be communicated and provided for display by the client device 120 to facilitate a generation of outputs by the server device 310, and a receipt of inputs from the client device 120. To this end, an identified set of collected worked data associated with a user account can be provided for display to a client device that is associated with the user account in a graphical format. Said interfaces may be communicated and provided for display by the client device 120 via the communication component 320.

The present disclosure can be utilized to, as previously described, provide analytical insight into farming methodologies, harvest yields, employee efficiencies, and more. Specifically, effective swath width data identified herein (via automatically collecting worked data) can be used to generate analytical output including, for instance, a number of acres worked in a given time, an amount of product used to cover an area, time spent in an area, harvest yield, field coverage, field boundary generation, and more. The resulting analysis/output can also be utilized to create coverage map data through generation of the effective swath width allowing users, in turn, to more accurately calculate efficiency. By way of example, a number of acres worked can be calculated based on the tracked course of traversal and the swath width. The calculated analytical outputs can be provided via a display by a computing device. The calculated analytical outputs can also be stored to a memory, such as data store 110.

While described with respect to agricultural use, the present disclosure can be implemented in a variety of industries. For instance, the disclosure described herein can have applicability to any activity involving a course of traversal over a collection area. Specific examples include search and rescue missions, aerial pass spraying, and the like.

Figure 7:
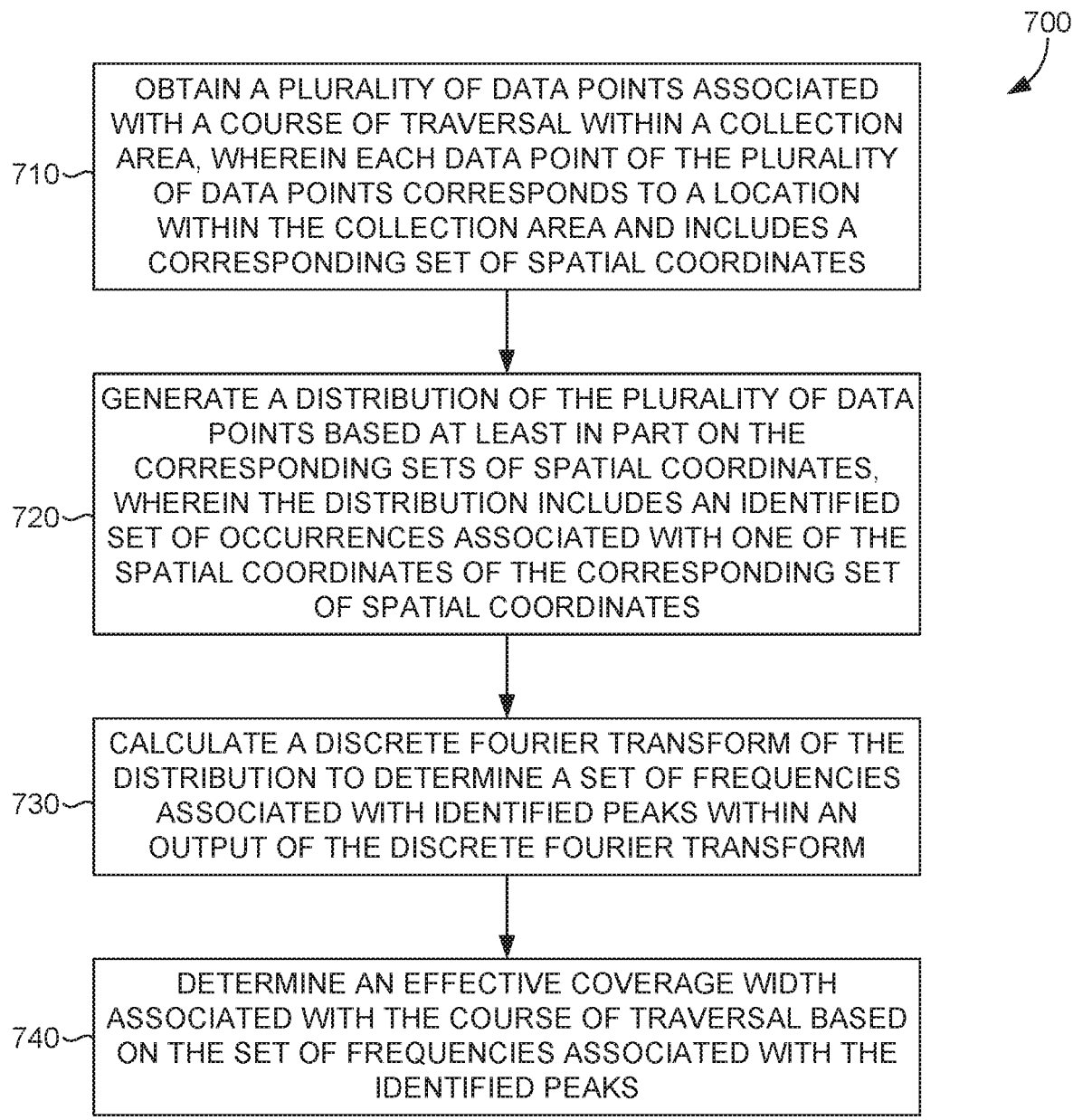
FIG. 7 is a flow diagram showing a method for tracking machine-collected worked data to generate analytics used to determine agronomic metrics in accordance with some embodiments of the present disclosure.

Turning now to FIG. 7, a flow diagram 700 is provided that illustrates a method for tracking machine-collected worked data to generate analytics used to determine agronomic metrics. As described in accordance with FIG. 3, a computing device, such as server device 310 of FIGS. 1 and 3, can obtain a plurality of data points associated with a course of traversal within a collection area from a data collection device, such as data collection device 200 of FIGS. 1 and 2 at step 710. The plurality of data points correspond to a location within the collection area and includes a corresponding set of spatial coordinates, such as GPS coordinates. The plurality of data points can also include sensor data obtained by various sensors coupled to farming machinery, by way of non-limiting example. The plurality of data points may be tagged by the data collection device 200 to include location information, time stamps, and/or other generated metadata, among other things. The collected worked data can be communicated from the data collection device to the server device and received by the server device. In some embodiments, the server device can store the collected worked data to a memory, such as data store 110 of FIG. 1.

At step 720, a distribution of the plurality of data points is generated based at least in part on the corresponding set of spatial coordinates. The distribution includes an identified set of occurrences associated with one of the spatial coordinates of the corresponding set of spatial coordinates. The distribution can be a horizontal distribution. The distribution can be generated in a format consumable by a Fourier transform such that it can be fed into a Fourier transform to output a Fourier analysis.

At step 730, a discrete Fourier transform of the distribution is calculated to determine a set of frequencies associated with identified peaks. Patterns are extracted from the input distribution and used to create an output distribution that represents a frequency of the input pattern. Each peak within the identified peaks (or set of peaks) represents a probability of a row spacing such that spacing between the rows can be determined at step 740 and identified as an effective coverage width associated with the course of traversal based on the frequencies associated with identified occurrences.

Utilizing this method, multiple rotations can be incorporated to create a distribution in a 1-D format. Additionally, smoothing filters can be applied to the distribution to reduce or eliminate noise from the data. Furthermore, the analytic outputs (e.g., the effective coverage width, the Fourier analysis, among others) can be communicated, via a user interface, to the client device 120 of FIG. 1.

Having described embodiments of the present disclosure, an exemplary operating environment in which embodiments of the present disclosure may be implemented is described below in order to provide a general context for various aspects of the present disclosure. Referring initially to FIG. 8 in particular, an exemplary operating environment for implementing embodiments of the present disclosure is shown and designated generally as computing device 800. Computing device 800 is but one example of a suitable computing environment and is not intended to suggest any limitation as to the scope of use or functionality of the described embodiments. Neither should the computing device 800 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present disclosure provide for, among other things, tracking the provenance of collected machine or agronomic worked data (i.e., farming data) to provide secured access to authorized user accounts, provide auditability of the collected worked data, and also enable transactional oversight of the collected worked data exchanged between authorized user accounts. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more processors, cause the one or more processors to: obtain, via a data collection device coupled to a farming machine having an attached implement with an actual swath width, a plurality of data points associated with a course of traversal within a collection area, wherein each data point of the plurality of data points corresponds to a location within the collection area and includes a corresponding set of spatial coordinates; generate a histogram distribution comprising a plurality of coordinate bins, wherein each coordinate bin represents a count of data points for a spatial coordinate of the set of spatial coordinates collected during the course of traversal; perform Fourier transform on the histogram distribution to produce a Fourier analysis output; determine an effective overage width of the farming machine during the course of traversal from a peak within the Fourier analysis output, the effective coverage width corresponding to an inverse value at the peak; and provide for display to the client device the determined effective overage width of the farming machine over the course of traversal, wherein the effective coverage width is different than the actual swath width of the attached implement.

2. The medium of claim 1, wherein the course of traversal includes a set of substantially parallel lines.

3. The medium of claim 2, wherein the course of traversal is substantially serpentine.

4. The medium of claim 1, wherein the plurality of data points is rotated from a second direction to the first physical direction.

5. The medium of claim 1, wherein the corresponding set of spatial coordinates includes a Universal Transverse Mercator (UTM) coordinate.

6. The medium of claim 1, wherein the instructions further cause the one or more processors to:
generate the corresponding set of spatial coordinates for each data point in the plurality of data points based on a received plurality of Global Positioning Satellite (GPS) coordinates.

7. The medium of claim 1, wherein the instructions further cause the one or more processors to:
rotate the plurality of data points to determine that the count of data points is associated with a maximum count value.

8. The medium of claim 1, wherein the histogram distribution of the plurality of data points is a horizontal distribution.

9. The medium of claim 1, wherein the instructions further cause the one or more processors to:
apply a smoothing filter to the histogram distribution of the plurality of data points.

10. The medium of claim 1, wherein the instructions further cause the one or more processors to:
calculate at least one of a total coverage area or an efficiency value based on the effective coverage width and the corresponding set of spatial coordinates.

11. A computer-implemented method for analyzing collected spatial data, the method comprising: obtaining, by a computing device, a plurality of data points associated with a course of traversal of a farming machine having an attached implement with an actual swath width, the course of traversal being within a collection area, wherein each data point of the plurality of data points corresponds to a location within the collection area and includes a corresponding set of spatial coordinates; generating, by the computing device, a histogram distribution comprising a plurality of coordinate bins, wherein each coordinate bin represents a count of data points for a spatial coordinate of the set of spatial coordinates collected during the course of traversal; performing Fourier transform on the histogram distribution to produce a Fourier analysis output; determining, by the computing device, an effective coverage width of the farming machine during the course of traversal, the effective coverage width determined from a peak within the Fourier analysis output, wherein the effective coverage width is different than the actual swath width of the attached implement; and providing for display, at the computing device, the effective coverage width of the farming machine over the course of traversal.

12. The computer-implemented method of claim 11, further comprising:
rotating, by the computing device, the plurality of data points to determine that the count of data points is associated with a maximum count value.

13. The computer-implemented method of claim 11, further comprising:
applying, by the computing device, a smoothing filter to the histogram distribution representing the plurality of coordinate bins.

14. The computer-implemented method of claim 11, wherein the course of traversal includes a set of substantially parallel lines, and wherein the course of traversal is substantially serpentine.

15. The computer-implemented method of claim 11, wherein the plurality of data points is rotated from a second direction to the first physical direction.

16. The computer-implemented method of claim 11, wherein the plurality of data points is obtained from a data collection device associated with the farming machine.

17. A system comprising:
a farming machine having an attached implement with an actual swath width;
a data collection device coupled to the farming machine;
one or more hardware processors; and
a machine-readable hardware storage device coupled with the one or more hardware processors, the machine-readable hardware storage device storing instructions that, when executed by the one or more processors, cause the system to perform operations comprising:
obtaining from the data collection device a plurality of data points associated with a course of traversal of the farming machine within a collection area, wherein each data point of the plurality of data points corresponds to a location within the collection area and includes a corresponding set of spatial coordinates;

generating a one-dimensional histogram distribution comprising a plurality of coordinate bins, wherein each coordinate bin represents a count of data points for a spatial coordinate of the set of spatial coordinates collected during the course of traversal;

performing Fourier transform on the histogram distribution to produce a Fourier analysis output;

determining an effective coverage width of the farming machine during the course of traversal, wherein the effective coverage width is different than the actual swath width of the attached implement; and providing for display the effective coverage width of the farming machine over the course of traversal.

18. The system of claim 17, wherein the plurality of data points is rotated from a second direction to the first physical direction.

\* \* \* \* \*

UNITED STATES PATENT AND TRADEMARK OFFICE
CERTIFICATE OF CORRECTION

PATENT NO. : 10,849,264 B1
APPLICATION NO. : 16/418632
DATED : December 1, 2020
INVENTOR(S) : Joshua Freudenhammer and Daniel Mola Page 1 of 1

It is certified that error appears in the above-identified patent and that said Letters Patent is hereby corrected as shown below:

On the Title Page

In Column 1, item (72), Inventors, Lines 1 and 2: Please remove "Daniel Mola, Paola, KS (US); Joshua Freudenhammer, Olathe, KS (US)" and replace with --Joshua Freudenhammer, Olathe, KS (US); Daniel Mola, Paola, KS (US)--.

Signed and Sealed this
Fifth Day of January, 2021

Andrei Iancu
*Director of the United States Patent and Trademark Office*